(12) United States Patent
Song et al.

(10) Patent No.: US 8,735,018 B2
(45) Date of Patent: May 27, 2014

(54) FUEL CELL STACK HAVING A MEMBRANE ELECTRODE ASSEMBLY WITH A PROTECTIVE LAYER AT AN OXIDANT INLET REGION

(75) Inventors: Kah-Young Song, Yongin-si (KR); Jin-Hwa Lee, Yongin-si (KR); Sang-Il Han, Yongin-si (KR); Hee-Tak Kim, Yongin-si (KR); Tae-Yoon Kim, Yongin-si (KR); Sung-Yong Cho, Yongin-si (KR); Myoung-Ki Min, Yongin-si (KR); Geun-Seok Chai, Yongin-si (KR)

(73) Assignee: Samsung SDI Co., Ltd. (KR)

( * ) Notice: Subject to any disclaimer, the term of this patent is extended or adjusted under 35 U.S.C. 154(b) by 388 days.

(21) Appl. No.: 12/817,359

(22) Filed: Jun. 17, 2010

(65) Prior Publication Data

US 2011/0195331 A1   Aug. 11, 2011

(30) Foreign Application Priority Data

Feb. 5, 2010   (KR) .................. 10-2010-0011006

(51) Int. Cl.
*H01M 8/02*   (2006.01)
*H01M 8/10*   (2006.01)
*H01M 8/24*   (2006.01)

(52) U.S. Cl.
USPC ........... 429/483; 429/457; 429/458; 429/468; 429/480

(58) Field of Classification Search
USPC ......... 429/479, 494, 452, 535, 513, 314, 317, 429/414, 483, 480, 457, 458, 468
See application file for complete search history.

(56) References Cited

U.S. PATENT DOCUMENTS

| | | | |
|---|---|---|---|
| 3,522,095 A * | 7/1970 | Baker, Jr et al. | 429/479 |
| 6,489,050 B1 * | 12/2002 | Ruhl et al. | 429/439 |
| 2002/0061432 A1 * | 5/2002 | Nakano et al. | 429/33 |
| 2002/0068214 A1 * | 6/2002 | Reiser | 429/41 |
| 2002/0197523 A1 * | 12/2002 | Ohara et al. | 429/38 |
| 2003/0091885 A1 * | 5/2003 | Kobayashi et al. | 429/32 |
| 2004/0091767 A1 | 5/2004 | Zuber et al. | |
| 2007/0196711 A1 | 8/2007 | Takeguchi et al. | |

FOREIGN PATENT DOCUMENTS

| | | | |
|---|---|---|---|
| EP | 1 956 669 A1 | 8/2008 | |
| JP | 2004/047230 A * | 2/2004 | ............. H01M 8/02 |
| JP | 2004-134392 | 4/2004 | |
| JP | 2007-109576 | 4/2007 | |

(Continued)

OTHER PUBLICATIONS

Machine Translation of: JP 2008/071542 A, Hato et al., Mar. 27, 2008.*
Machine Translation of: JP 2004/047230 A, Kinoshita, Feb. 12, 2004.*

(Continued)

*Primary Examiner* — Kenneth Douyette
(74) *Attorney, Agent, or Firm* — Knobbe, Martens, Olson & Bear LLP

(57) ABSTRACT

A fuel cell stack includes membrane-electrode assemblies and separators that are closely disposed to both sides of the membrane-electrode assembly. Each membrane-electrode assembly includes an electrolyte membrane, an anode electrode that is formed on one surface of the electrolyte membrane, a cathode electrode that is formed on the other surface of the electrolyte membrane, and a protective layer formed at an oxidant inlet region where oxidant is first injected into the respective cathode electrode.

9 Claims, 4 Drawing Sheets

(56) References Cited

FOREIGN PATENT DOCUMENTS

| | | |
|---|---|---|
| JP | 2008-071542 A | 3/2008 |
| JP | 2008-192575 A | 8/2008 |
| JP | 2010-027234 A | 2/2010 |
| KR | 10-2006-0130252 A | 12/2006 |

OTHER PUBLICATIONS

Korean Intellectual Property Office (KIPO) Office Action in related Korean Patent Application No. 10-2010-0011006 without English translation.

KIPO Notice of Allowance (Korean only) in related Korean Application No. 10-2010-0011006 dated Oct. 31, 2012.

\* cited by examiner

FUEL CELL STACK HAVING A MEMBRANE ELECTRODE ASSEMBLY WITH A PROTECTIVE LAYER AT AN OXIDANT INLET REGION

CROSS-REFERENCE TO RELATED APPLICATION

This application claims the benefit of Korean Application No. 10-2010-0011006, filed Feb. 5, 2010 in the Korean Intellectual Property Office, the disclosure of which is incorporated herein by reference.

BACKGROUND

1. Field

Aspects of the described technology relate generally to a fuel cell stack, and more particularly, to a structure for preventing a membrane-electrode assembly from deteriorating.

2. Description of the Related Art

A fuel cell system includes a fuel cell stack that generates electrical energy using an electrochemical reaction of fuel (hydrocarbonaceous fuel, pure hydrogen, or hydrogen-enriched reformed gas) and oxidant (air or pure oxygen). A direct oxidation fuel cell uses a hydrocarbonaceous fuel in a liquid phase or a gas phase and a polymer electrolyte type fuel cell uses pure hydrogen or hydrogen-enriched reformed gas as fuel.

The fuel cell stack includes a plurality of membrane-electrode assemblies (MEA) and a plurality of separators that are positioned therebetween.

Each membrane-electrode assembly includes an electrolyte membrane, an anode electrode that is positioned on one surface of the electrolyte membrane, and a cathode electrode that is positioned on the other surface of the electrolyte membrane. A fuel channel that supplies fuel to the anode electrode is formed in the separator contacting the anode electrode and an oxidant channel that supplies oxidant to the cathode electrode is formed in the separator contacting the cathode electrode.

When the oxidant supplied to the fuel cell stack is in a non-humidified state or a low humidified state, the regions where the oxidant is first injected into the cathode electrodes, that is, the regions which are closest to the oxidant inlet manifold included in the separators, are operated in a very dry state. That very dry state creates the condition that radicals generated during the operation of the membrane-electrode assemblies can be sustained in the membrane-electrode assemblies for a long time, such that the membrane-electrode assemblies are vulnerable to deterioration.

In particular, since the region in each cathode electrode that is closest to the oxidant inlet manifold has a higher flux and pressure than in other regions, the deterioration of the catalyst layers of respective cathode electrodes is intensified. Once started, the deterioration induces further deterioration, thereby accelerating the deterioration of the membrane-electrode assemblies.

The above information disclosed in this Background section is only for enhancement of understanding of the background of the described technology and therefore it may contain information that does not form the prior art that is already known in this country to a person of ordinary skill in the art.

SUMMARY

Aspects of the described technology have been made in an effort to provide a fuel cell stack that suppresses the initial deterioration of the membrane-electrode assemblies therein and therefore to prevent further deterioration and deterioration acceleration.

According to an exemplary embodiment of the present invention, a fuel cell stack includes membrane-electrode assemblies and separators where each separator is disposed closely on both sides of the respective membrane-electrode assembly. Each membrane-electrode assembly includes an electrolyte membrane, an anode electrode that is formed on one surface of the electrolyte membrane, a cathode electrode that is formed on the other surface of the electrolyte membrane, and a protective layer at an oxidant inlet region where oxidant is first injected into the cathode electrode.

Each cathode electrode includes a catalyst layer and a gas diffusion layer that covers the catalyst layer. The respective protective layer may be positioned between the catalyst and the gas diffusion layer.

Each anode electrode and each cathode electrode is formed at a smaller size than that of the respective electrolyte membrane. Each membrane-electrode assembly may further include a supporting film that is fixed to an edge of the respective electrolyte membrane. An oxidant inlet manifold and an oxidant outlet manifold are formed in the supporting film and each oxidant inlet region may be defined as the region that is closest to the oxidant inlet manifold.

An oxidant channel is formed on the surface of each separator facing a cathode electrode. Each protective layer may be formed in parallel with the length direction of the respective oxidant channel, having a width equal to or larger than that of the oxidant channel.

Each protective layer may be formed of a film or a gasket. The protective layer may be attached to the respective cathode electrode by including an adhesive layer. On the other hand, a portion of the supporting film may extend to the oxidant inlet region, such that the protective layer and the supporting film can be integrally formed.

According to another exemplary embodiment of the present invention, a protective layer covers and protects the oxidant inlet region of the respective cathode electrode, such that the initial deterioration of the cathode electrode due to the injection of the dry oxidant can be effectively suppressed. Therefore, the deterioration of the membrane-electrode assemblies can be prevented, and thus, the lifespan of the fuel cell stack can be increased.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION

Figure 1:
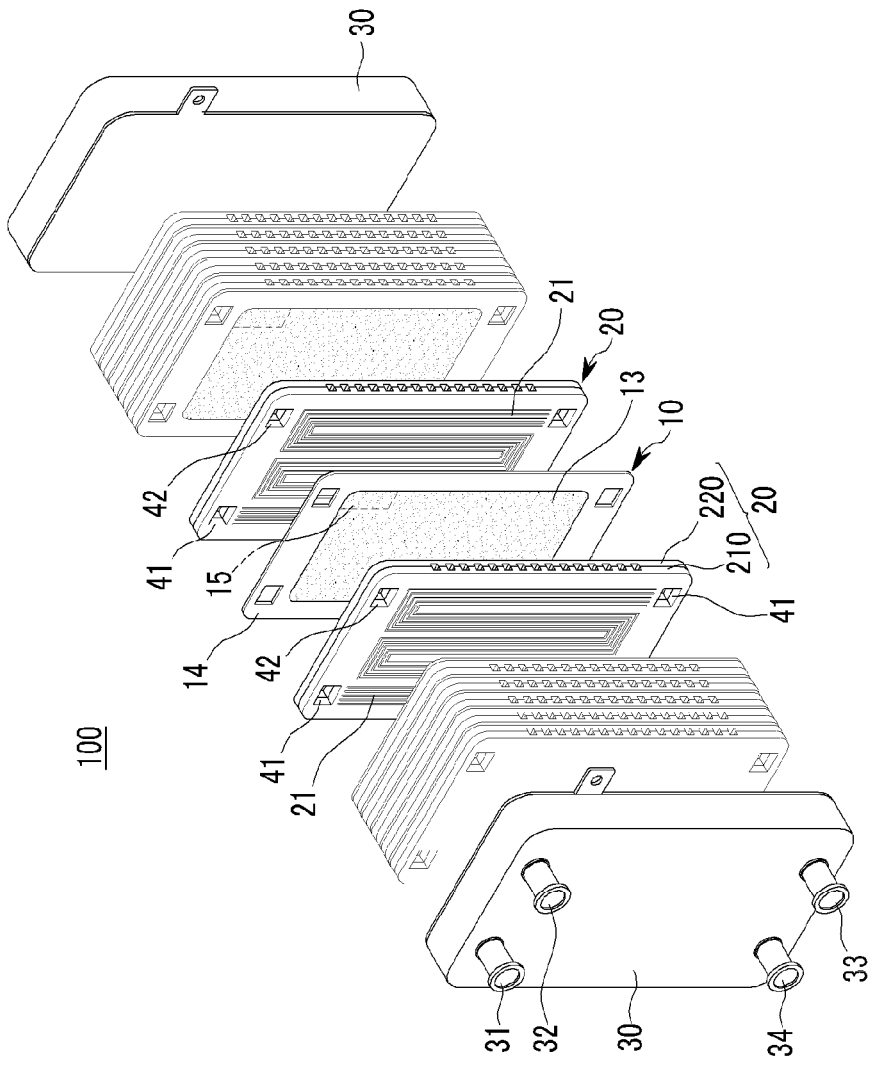
FIG. 1 is an exploded perspective view of a fuel cell stack according to an exemplary embodiment of the present invention.

Reference will now be made in detail to the present embodiments of the present invention, examples of which are illustrated in the accompanying drawings, wherein like reference numerals refer to the like elements throughout. The embodiments are described below in order to explain the present invention by referring to the figures. Moreover, it is to be understood that where is stated herein that one layer is "formed on" or "disposed on" a second layer, the first layer may be formed or disposed directly on the second layer or there may be an intervening layer between the first layer and the second layer. Further, as used herein, the term "formed on" is used with the same meaning as "located on" or "disposed on" and is not meant to be limiting regarding any particular fabrication process.

Figure 2:
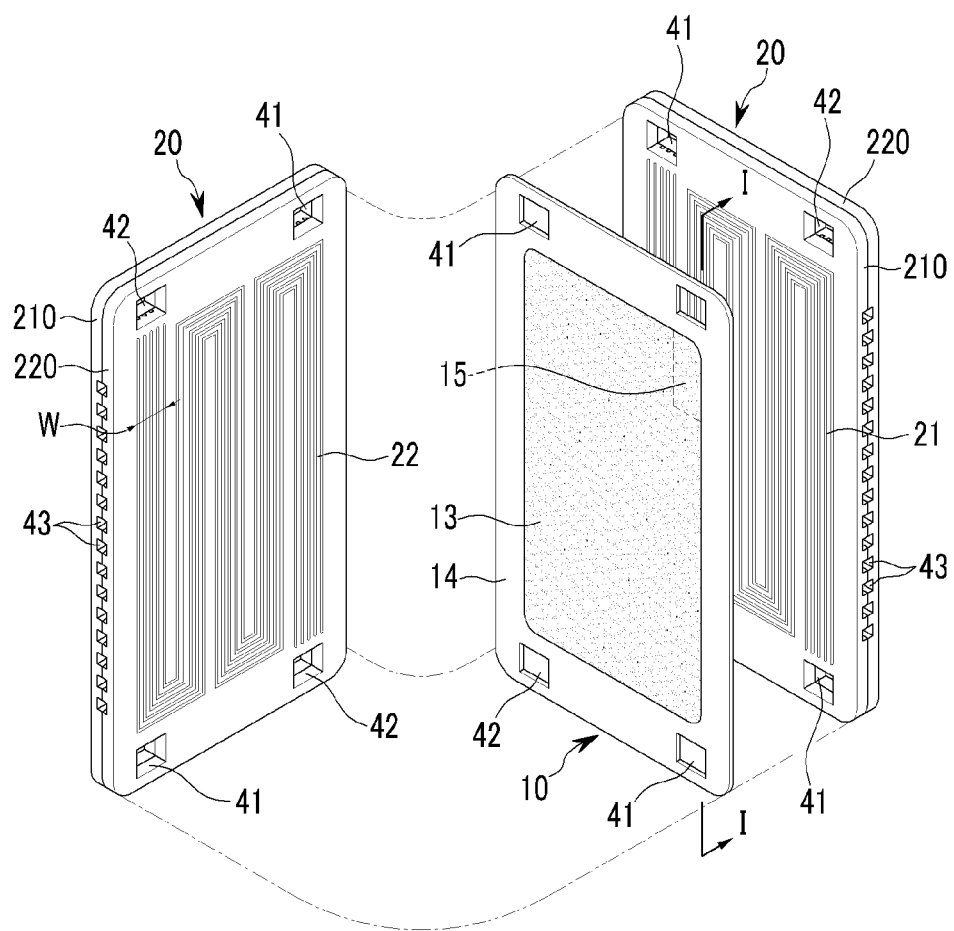
FIG. 2 is an exploded perspective view showing one membrane-electrode assembly and two separators of the fuel cell stack shown in FIG. 1.

FIG. 1 is an exploded perspective view of a fuel cell stack according to an exemplary embodiment of the present invention and FIG. 2 is an exploded perspective view showing one membrane-electrode assembly and two separators of the fuel cell stack shown in FIG. 1.

Referring to FIGS. 1 and 2, a fuel cell stack 100 of the present exemplary embodiment includes a plurality of membrane-electrode assemblies 10 and a plurality of separators 20 that is closely attached to the membrane-electrode assemblies 10 between the membrane-electrode assemblies 10. One membrane-electrode assembly 10 and two separators 20 that are positioned at both sides thereof forms one unit cell that generates electrical energy.

Each membrane-electrode assembly 10 is supplied with fuel and oxidant and generates electrical energy by using an electrochemical reaction of fuel and oxidant. A fuel channel 21 that supplies a fuel is formed in the separator 20 that is positioned at one side of the membrane-electrode assembly 10 and an oxidant channel 22 that supplies oxidant is formed in the separator 20 that is positioned at the other side of the membrane-electrode assembly 10. The separators 20 also support the membrane-electrode assemblies 10 which assemblies otherwise have little mechanical strength. Thus, the separators 20 support the membrane-electrode assemblies 10 and electrically connect the membrane-electrode assemblies 10.

The fuel cell stack 100 may be supplied with hydrocarbonaceous fuel (such as methanol, ethanol, liquefied petroleum gas, liquefied natural gas, gasoline, and butane gas, etc.) in a liquid phase or a gas phase; cracked hydrogen cracked by a reformer from the hydrocarbonaceous fuel; or hydrogen-enriched reformed gas. The fuel cell stack 100 may be supplied with pure oxygen stored in a separate storage unit as oxidant or may be supplied with external air containing oxygen.

The outermost faces of the fuel cell stack 100 are provided with a pair of end plates 30 that integrally fix the fuel cell stack 100. Either of the end plates 30 may be formed with a fuel injection hole 31 that supplies fuel, an oxidant injection hole 32 that supplies oxidant, a fuel outlet 33 that discharges unreacted fuel, and an oxidant outlet 34 that discharges moisture and unreacted oxidant.

Although FIG. 1 shows the case where one end plate 30 of the end plates 30 is provided with two injection holes 31 and 32 and two outlets 33 and 34, one of the end plates 30 may be provided with the fuel injection hole 31 and the oxidant injection hole 32 and the other one of the end plates 30 may be formed with the fuel outlet 33 and the oxidant outlet 34.

Figure 3:
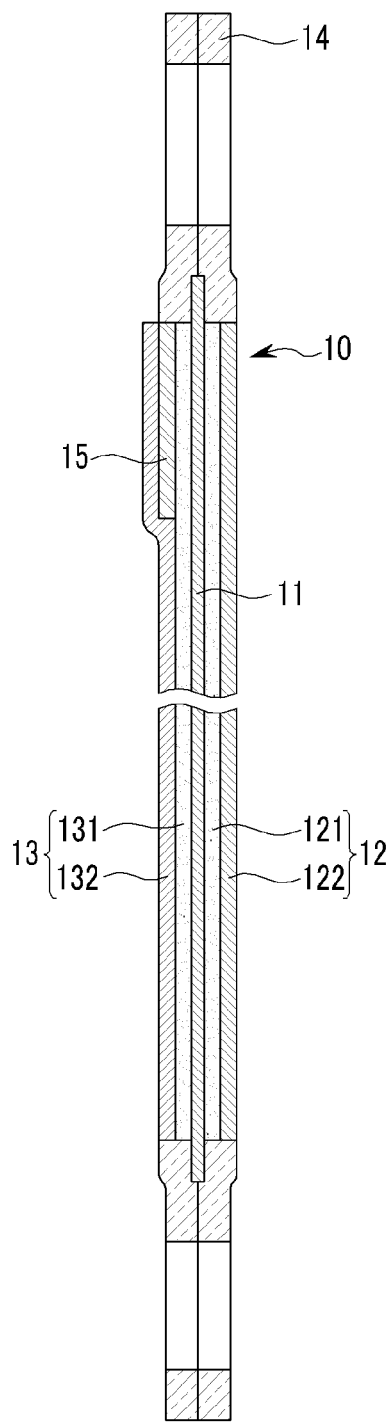
FIG. 3 is a cross-sectional view of a membrane-electrode assembly taken along the line I-I of FIG. 2.

FIG. 3 is a cross-sectional view of a membrane-electrode assembly taken along the line I-I of FIG. 2. Referring to FIGS. 2 and 3, each membrane-electrode assembly 10 includes an electrolyte membrane 11, an anode electrode 12 that is formed at one surface of the electrolyte membrane 11, a cathode electrode 13 that is formed at the opposite side of the electrolyte membrane 11, a supporting film 14 that is fixed to an edge of the electrolyte membrane 11, and a protective layer 15 that is positioned at a region where an oxidant is first injected into the cathode electrode 13.

Each anode electrode 12 is supplied with fuel and includes a catalyst 121 that converts hydrogen in the fuel into electrons and hydrogen ions by an oxidation reaction and a gas diffusion layer 122 that covers the catalyst layer 121. Each cathode electrode 13 is supplied with oxidant and includes a catalyst 131 that converts oxygen in the oxidant into electrons and oxygen ions by a reduction reaction and a gas diffusion layer 132 that covers the catalyst layer 131.

Each electrolyte membrane 11 has an ion exchange function that moves protons generated in the anode electrode 12 to the cathode electrode 13. Each anode electrode 12 and each cathode electrode 13 are formed at a smaller size than the respective electrolyte membrane 11 and each supporting film 14 is attached to the edge of the respective electrolyte membrane 11. The supporting film 14 suppresses the expansion and generation of creases in the electrolyte membrane 11 due to moisture adsorption. The supporting film 14 is mechanically connected with the separator 20.

Each separator 20 may be divided into an anode separator 210 that faces the anode electrode 12 and a cathode separator 220 that faces cathode electrode 13. A fuel channel 21 is provided in the anode separator 210 and an oxidant channel 22 is provided in the cathode separator 220. The anode separator 210 and the cathode separator 220 may be integrally bonded to each other and thus, the separator 20 is also called a bipolar plate.

Formed at a common position in the anode separators 210, the cathode separators 220, and the supporting films 14 of the membrane-electrode assemblies 10 are two fuel manifolds 41 that pass through fuel and two oxidant manifolds 42 that pass through oxidant. Each fuel channel 21 is connected to the two fuel manifolds 41 and each oxidant channel 22 is connected to the two oxidant manifolds 42.

The fuel that that is supplied to the fuel injection hole 31 is dispersed into the fuel channels 21 of the anode separators 210 through the fuel injection holes manifold 41 that is connected to the fuel injection hole 31, which fuel is simultaneously supplied to the anode electrodes 12 of the membrane-electrode assemblies 10. The oxidant that is supplied to the oxidant injection hole 32 is dispersed into the oxidant channels 22 of the cathode separators 220 through the oxidant manifold 42 that is connected to the oxidant injection hole 32, which oxidant is simultaneously supplied to the cathode electrodes 13 of the membrane-electrode assemblies 10. Thereby, electrical energy is generated by the electrochemical reaction of fuel and oxidant in the membrane-electrode assemblies 10.

The unreacted fuel that is not used in the electrochemical reaction of the membrane-electrode assemblies 10 is discharged to the outside of the fuel cell stack 100 through the fuel outlet 33 via the opposing fuel manifold 41. The unreacted oxidant that is not used in the electrochemical reaction of the membrane-electrode assemblies 10 and moisture generated as the by-products of the electrochemical reaction are discharged to the outside of the fuel cell stack 100 through the oxidant outlet 34 via the opposing oxidant manifold 42.

Since the oxidant that is supplied to the fuel cell stack 100 is in a non-humidified state, the region where oxidant is first injected into each cathode electrode 13 is very dry. On the other hand, moisture is generated as the by-products of the electrochemical reaction in the remaining regions other than the region where oxidant is first injected into each cathode electrode 13, thereby maintaining a humidified state.

For convenience, an area that is positioned to be closest to any one of oxidant manifolds 42 supplied with oxidant, that is, the oxidant inlet manifold 42 to be supplied with oxidant through the oxidant channel 22 is called an 'oxidant inlet region'. A protective layer 15 is provided at the oxidant inlet region within each cathode electrode 13 to protect the respective oxidant inlet region.

The protective layers 15 are formed of a thin film or a gasket and may be made of a polymer, a ceramic, or a polymer-ceramic composite, etc. Each protective layer 15 is positioned between the catalyst layer 131 of the respective cathode electrode 13 and the respective gas diffusion layer 132 and includes an adhesive layer (not shown) formed on at least one surface thereof so that each protective layer 15 is firmly attached to the respective cathode electrode 13. Each protective layer 15 separates the oxidant inlet region of the respective catalyst layer 131 and the respective oxidant channel 22 so that they do not contact each other, thereby preventing the oxidant supplied to the oxidant channel 22 from supplying oxidant to the oxidant inlet region of that catalyst layer 131.

As described above, the protective layers 15 prevent the dried oxidant from being supplied to the oxidant inlet region of the cathode electrodes 13, thereby effectively suppressing the initial deterioration of the cathode electrodes 13. In other words, the protective layers 15 cover and protect the dried oxidant inlet regions of the catalyst layers 131, such that they can suppress radical generation and the initial deterioration. Therefore, further deterioration and the initial deterioration acceleration of the membrane-electrode assemblies 10 due to the initial deterioration can be prevented.

A cathode electrode 13 does not complete the electrical reaction in the oxidant inlet region due to the respective protective layer 15, such that the area contributing to generation of electrical energy is reduced. However, since the deterioration of the oxidant inlet region may be considered as a defect factor rather than a power loss caused due to the reduction in the area, it is important to suppress the deterioration in the oxidant inlet region.

The shape and size of a protective layer 15 are not limited to a specific example, but any protective layer 15 having the shape and size that can cover and protect the otherwise dry portion of the cathode electrode 13 can be used. For example, a protective layer 15 may be formed in a rectangular shape having a long side in parallel with the length direction of the oxidant channel 22, having a width equal to or larger than a width, W, (see FIG. 2) of the respective oxidant channel 22 and including a plurality of grooves.

Meanwhile, an inner surface of each anode separator 210 and an inner surface of each cathode separator 220 may be formed with cooling channels 43. The cooling channels 43 are connected to a blower (not shown) and the external air flows into the cooling channels 43 by the force generated by the blower. Therefore, the temperature of the fuel cell stack 100 can be lowered due to the heat exchange between the external air and the fuel cell stack 100.

Figure 4:
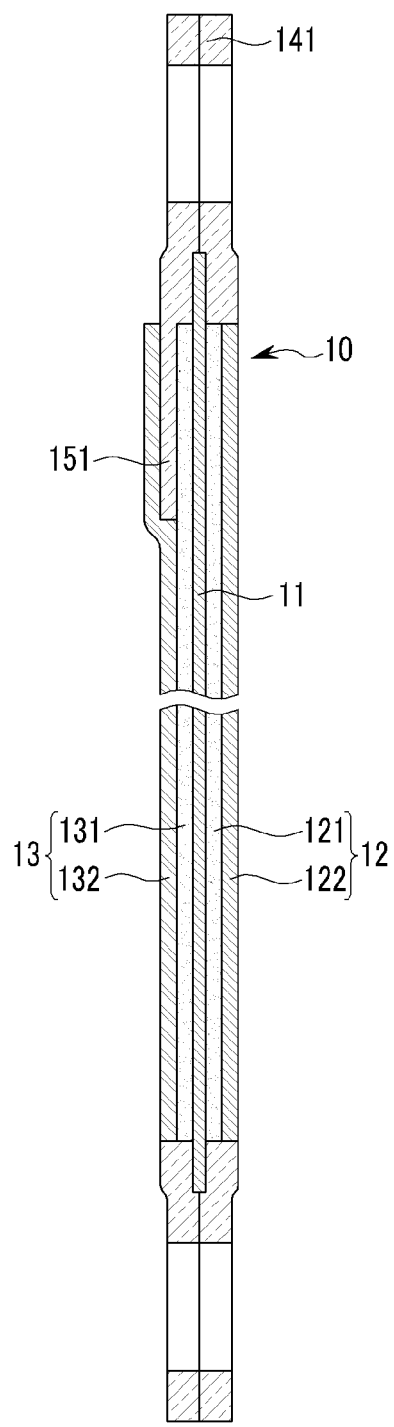
FIG. 4 is a cross-sectional view of a membrane-electrode assembly of a fuel cell stack according to another exemplary embodiment of the present invention.

FIG. 4 is a cross-sectional view of a membrane-electrode assembly of a fuel cell stack according to another exemplary embodiment of the present invention. Referring to FIG. 4, the fuel cell stack according to this embodiment has the same configuration of the fuel cell stack 100 according to the previous embodiment except that a portion of a supporting film 141 of a membrane-electrode assembly 10 extends above the oxidant inlet region of the cathode electrode 13 and the catalyst layer 131 to integrally form the protective layer 151 and the supporting film 141. The same components as the previous exemplary embodiment are denoted with the same reference numerals.

In the previous exemplary embodiment, the supporting film 14 is formed in a hollow frame shape, but in this exemplary embodiment, the supporting film 141 forms a further portion at the oxidant inlet region of the cathode electrode 13, such that the further portion becomes the protective layer 151. In this exemplary embodiment where the protective layer 151 and the supporting film 141 are integrally formed, the process of manufacturing the protective layer 151 and the process of attaching the protective layer 151 can be omitted, thereby making it possible to increase the productivity of manufacture of the fuel cell stack.

Although a few embodiments of the present invention have been shown and described, it would be appreciated by those skilled in the art that changes may be made in this embodiment without departing from the principles and spirit of the invention, the scope of which is defined in the claims and their equivalents.

What is claimed is:

1. A fuel cell stack, comprising:
   membrane-electrode assemblies;
   separators disposed on both sides of each of the membrane-electrode assemblies; and
   an oxidant manifold penetrating the membrane-electrode assemblies and the separators,
   wherein each of the membrane-electrode assemblies includes:
   an electrolyte membrane having a first surface and a second surface formed opposite the first surface,
   an anode electrode formed on the first surface of the electrolyte membrane, a cathode electrode formed on the second surface of the electrolyte membrane, the cathode electrode including a catalyst layer and a gas diffusion layer covering the catalyst layer, and
   a protective layer positioned only at an oxidant inlet region where oxidant is first injected into the cathode electrode and only between the catalyst and the gas diffusion layer, wherein the protective layer does not extend beyond either the catalyst or the gas diffusion layer.

2. The fuel cell stack of claim 1, wherein:
   each anode electrode and each cathode electrode are formed at a smaller size than that of the respective electrolyte membrane, and
   the respective membrane-electrode assembly includes a supporting film that is fixed to an edge of the electrolyte membrane.

3. The fuel cell stack of claim 2, wherein:
   an oxidant inlet manifold and an oxidant outlet manifold are formed through the supporting film, and
   the oxidant inlet region is the region closest to the oxidant inlet manifold.

4. The fuel cell stack of claim 1, each separator further comprising an oxidant channel on one surface facing the cathode electrode, wherein the protective layer is formed in parallel with the length direction of the oxidant channel, having a width equal to or larger than that of the oxidant channel.

5. The fuel cell stack of claim 1, wherein the protective layer is formed as a film or a gasket.

6. The fuel cell stack of claim 5, wherein each protective layer is attached to the respective cathode electrode by an adhesive layer.

7. The fuel cell stack of claim 2, wherein the protective layer is formed as a film or a gasket.

8. The fuel cell stack of claim 3, wherein the protective layer is formed as a film or a gasket.

9. The fuel cell stack of claim 4, wherein the protective layer is formed as a film or a gasket.

* * * * *